(12) United States Patent
Matsuyama et al.

(10) Patent No.: US 6,233,732 B1
(45) Date of Patent: *May 15, 2001

(54) COMPILING SYSTEM USING INTERMEDIATE CODES TO STORE A PLURALITY OF VALUES

(75) Inventors: Manabu Matsuyama; Yutaka Igarashi; KohIchiro Hotta; Masakazu Hayashi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,064

(22) Filed: Nov. 12, 1996

Related U.S. Application Data

(63) Continuation of application No. 08/239,419, filed on May 6, 1994, now abandoned.

(30) Foreign Application Priority Data

Jun. 17, 1993 (JP) .................................................... 5-145845

(51) Int. Cl.$^7$ ........................................................ G06F 3/00
(52) U.S. Cl. ...................................... 717/7; 717/5; 717/9
(58) Field of Search ................................... 709/100, 101, 709/102, 103, 104, 105, 107; 717/5, 6, 7; 700/100, 101, 102, 103

(56) References Cited

U.S. PATENT DOCUMENTS

| | | | | |
|---|---|---|---|---|
| 4,571,678 | * | 2/1986 | Chaitin | 395/700 |
| 4,667,290 | * | 5/1987 | Goss et al. | 395/700 |
| 4,951,195 | * | 8/1990 | Fogg, Jr. et al. | 364/200 |
| 5,307,492 | * | 4/1994 | Benson | 395/700 |
| 5,313,614 | * | 5/1994 | Goettelmann et al. | 395/500 |
| 5,339,238 | * | 8/1994 | Benson | 395/700 |
| 5,339,419 | * | 8/1994 | Chan et al. | 395/700 |
| 5,339,428 | * | 8/1994 | Burmeister et al. | 395/700 |
| 5,493,675 | * | 2/1996 | Faiman et al. | 395/700 |

FOREIGN PATENT DOCUMENTS

| | | |
|---|---|---|
| 62-221037 | 9/1987 | (JP) . |
| 2-081137 | 3/1990 | (JP) . |

* cited by examiner

*Primary Examiner*—Majid Banankhah
(74) *Attorney, Agent, or Firm*—Staas & Halsey LLP

(57) ABSTRACT

A compiling system includes a first unit for converting a source program into an intermediate text formed of intermediate codes, each of the intermediate codes having a portion used to explicitly indicate information regarding a state of computer hardware, the computer hardware being operated in accordance with a machine language program, and a second unit for generating a machine language program using the intermediate codes of the intermediate text. In addition, a compiling system includes a first unit for converting a source program into an intermediate text formed of intermediate codes, each of the intermediate codes having a portion used to define a plurality of values, and a second unit for generating a machine language program using the intermediate codes of the intermediate text.

17 Claims, 11 Drawing Sheets

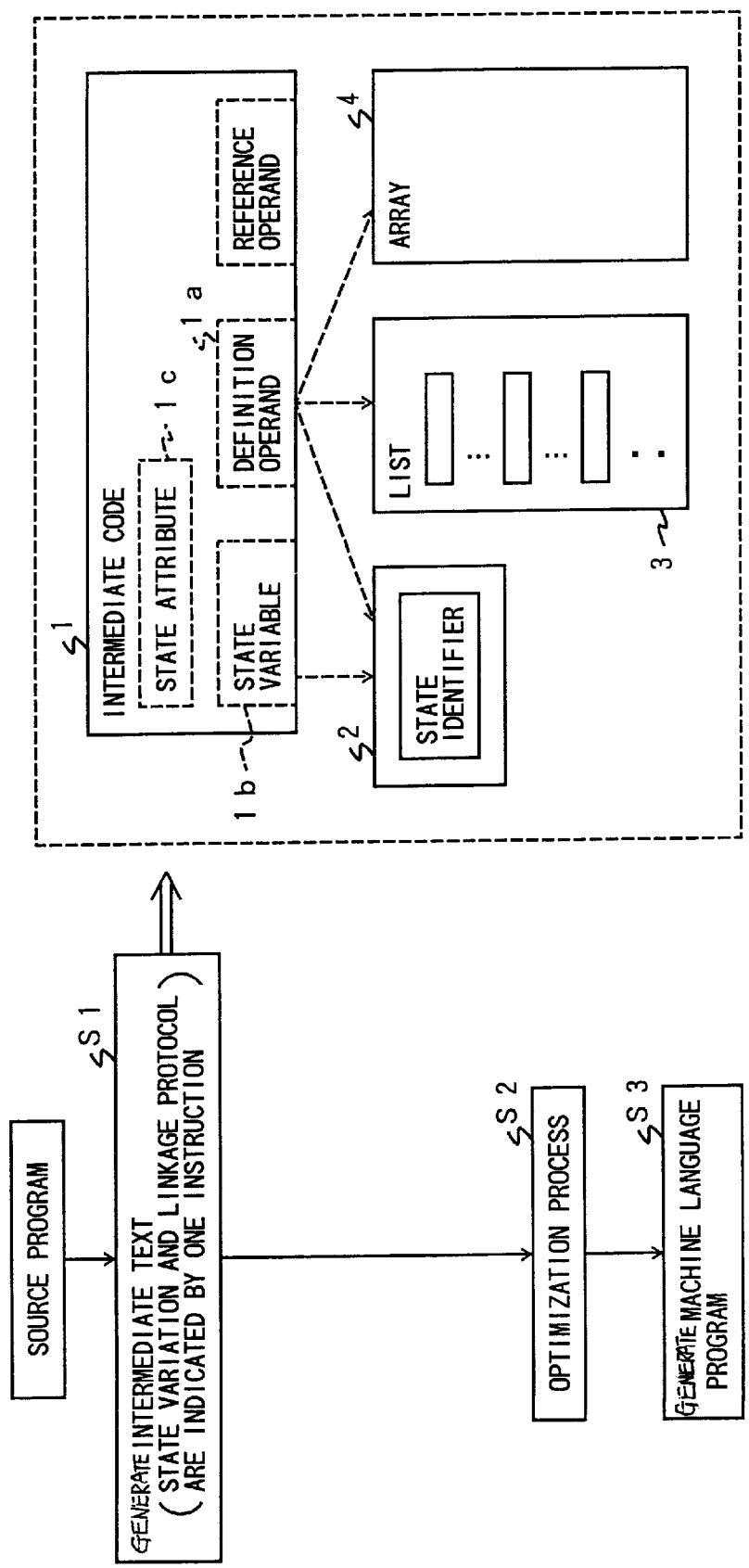
F I G. 1

COMPILING SYSTEM USING INTERMEDIATE CODES TO STORE A PLURALITY OF VALUES

This application is a continuation, of application Ser. No. 08/239,419, filed May 6, 1994, now abandoned.

BACKGROUND OF THE INVENTION

(1) Field of the Invention

The present invention relates to a compiling system in which a source program is converted into an intermediate text and machine language is generated using the intermediate text.

In a compiler for translating a source program into machine language, an intermediate text formed of intermediate codes is produced based on the source program so that the structure and states of the program are represented by the intermediate text. The present invention particularly relates to a compiling system in which operations regarding the intermediate text can be efficiently performed and the superior optimization effect can be obtained.

(2) Description of the Related Art

In the recent years, due to the progress of semiconductor technology, various architectures have been proposed. Particularly, architectures regarding the parallel processing of instructions, such as the VLIW and the superscalar, have been emphasized. The modern compiler must be able to efficiently make instructions using new optimization technology in which characteristics of these architectures are useful.

In a compiler, normally, a structural analysis of a source program is performed so that an intermediate text is obtained, and an optimization process with respect to the intermediate text is performed. The machine language is generated based on the results of the optimization process. A conventional compiler can not process intermediate instructions in each of which a plurality of values are defined.

In addition, the state change of a computer hardware is recorded in a status descriptor. For example, a condition code indicating that a result obtained by subtracting a variable B from a variable A is equal to or less than zero is recorded in a status descriptor. Conventionally, in the status descriptor as described above, the last intermediate code which described the state of an element, such as a register, of the computer hardware or an identifier for which a definition or reference was performed last is recorded. Thus, during the process, information recorded in the status descriptor is successively updated so that the last updated information usually remains in the status descriptor.

When functions are read out from a register, information in the register is destroyed. Thus, to determine the live or dead status of a variable, destruction of information in a register must be considered, other than the consideration of the definition and reference of the variable based on the normal intermediate text. Conventionally, a protocol regarding use of the register cannot be explicitly represented in the intermediate text.

The conventional technique regarding the compiler described above has the following disadvantages.

Since a plurality of values can not be defined in one intermediate code, one operation in the source program must be represented by a plurality of intermediate codes.

For example, a calculation of complex numbers must be represented, from an early step of the translation process for the source program, using a real part and an imaginary part into which each complex number is divided.

In the calculation of complex numbers, calculations for the real part and the imaginary part are separately performed, and a condition code obtained as a result of the calculation for the real part and a condition code obtained as a result of the calculation for the imaginary part must be respectively recorded. In the conventional case, since a plurality of values can not be defined by one intermediate code, in the calculation for complex numbers, the real part and the imaginary part must be separately represented by intermediate codes.

In the optimization process, to determine conditions indicating whether or not processes, such as a transferring process, a copying process and a deleting process, may be applied to an intermediate code, not only the intermediate code but also other intermediate codes sharing the same operation with the intermediate code must be checked. In addition, when an operation is actually applied to the intermediate code, it is necessary to apply the same operation to the other intermediate codes.

For example, in the case where one operation is separately represented by a real part and an imaginary part, such as the case of the calculation of complex numbers described above, it can not be determined, based on only a condition of an intermediate code for the real part, whether the instruction may be transferred, copied or deleted, and it is necessary to check an intermediate code for the imaginary part. In addition, in the case where the intermediate code for the real part is processed, it is necessary to process the intermediate code for the imaginary part.

When the live or dead status of variables is checked, it is necessary to consider the possibility that a variable having the same defining point as a variable defined in an intermediate code is defined in another intermediate code. In the case where the real part and the imaginary part of each complex number are separately represented by intermediate codes as described above, for example, even if operation results for the imaginary part among operation results for a complex number will not be used later, it is necessary for all the operation results for the complex number to be alive so that they may be used the real part. That is, to check the live or dead status of variables in an intermediate codes, it is necessary to consider other intermediate codes.

There are protocols on programming, such as a protocol determining registers in which parameters are to be set, for example, in a process for reading functions. When the live or dead status of a variable is checked, it is necessary to consider the above protocol regarding the registers. In the conventional case, since a plurality of values can not be defined by one intermediate code, the above protocol can not explicitly described by the intermediate code.

As has been described above, in the conventional case, there is a case where an operation in the source program must be represented by a plurality of intermediate codes which are separated from each other, so that the structure of the compiler is complex. As a result, the time required to translate the source program is increased.

In the optimization technique, such as a scheduling technique, in which some intermediate codes are transferred among intermediate codes generated from the source program, it is necessary to restore the state of the computer hardware based on the original intermediate codes after the intermediate codes are transferred. In the conventional case, since an intermediate code or a variable the state of which was determined last is stored in the status descriptor, it is difficult to restore the state of the computer hardware based on the original intermediate codes after the intermediate codes are transferred. As a result, the efficiency of the scheduling of the intermediate codes deteriorates.

That is, in the scheduling process in which the arrangement order of intermediate codes directly obtained from the source program is changed so as to be suitable for being processed by the computer, since there is a case where the arrangement of intermediate codes is not changed so as to be intended by a programmer, it is necessary to restore the state of computer hardware based on the original arrangement order of intermediate codes after the arrangement order of intermediate codes is changed. However, in the conventional case, the state of the computer hardware can not be easily restored after the arrangement order of intermediate codes is changed.

In a CPU having an architecture including a plurality of condition codes, a condition code set based on operation results is not determined independently of the control structure (the order of processes). That is, in the conventional case, the condition code can not be used as a variable, so that the condition code must be set when intermediate codes are generated and the condition code will not be changed later. As a result, the possibility of the scheduling is limited.

SUMMARY OF THE INVENTION

Accordingly, a general object of the present invention is to provide a novel and useful compiling system for source programs in which the disadvantages of the aforementioned prior art are eliminated.

A more specific object of the present invention is to provide a compiling system in which the scheduling process using the intermediate text can be efficiently performed.

The above objects of the present invention are achieved by a compiling system comprising: first means for converting a source program into an intermediate text formed of intermediate codes, each of the intermediate codes having a portion used to explicitly indicate information regarding a state of computer hardware, said computer hardware being operated in accordance with the machine language program; and second means for generating a machine language program using the intermediate codes of the intermediate text.

According to the present invention, the state change which occurs in the computer hardware based on an operation can be represented by a single intermediate code. Thus, it can be determined, based on the checking of the single intermediate code, whether or not the optimization process is to be performed. In addition, the state of the computer hardware at any position in a program and an intermediate code producing that state of the computer hardware can be easily known based on the information regarding the state of the computer hardware in each of the intermediate codes. As a result, the scheduling process using the intermediate text can be efficiently performed.

Another object of the present invention is to provide a compiling system in which it can be easily determined whether or not variables are alive.

Another object of the present invention is to provide a compiling system which can be efficiently used for a CPU having an architecture including a plurality of condition codes.

The above objects of the present invention are achieved by a compiling system comprising: first means for converting a source program into an intermediate text formed of intermediate codes, each of the intermediate codes having a portion used to define a plurality of values; and second means for generating a machine language program using the intermediate codes of the intermediate text.

According to the present invention, an operation in which a plurality of variables are defined can be represented by a signal intermediate code. Thus, an operation can be represented by a single intermediate code. As a result, it is easily determined whether or not a variable is alive in the operation. In addition, even if the CPU has an architecture utilizing a plurality of condition codes, the condition codes can be efficiently used.

Additional objects, features and advantages of the present invention will become apparent from the following detailed description when read in conjunction with the accompanying drawings.

BRIEF DESCRIPTION OF THE DRAWINGS

FIG. 1 is a diagram illustrating an essential structure of a compiler provided in the compiling system according to an embodiment of the present invention.

DESCRIPTION OF THE PREFERRED EMBODIMENT

Figure 2:
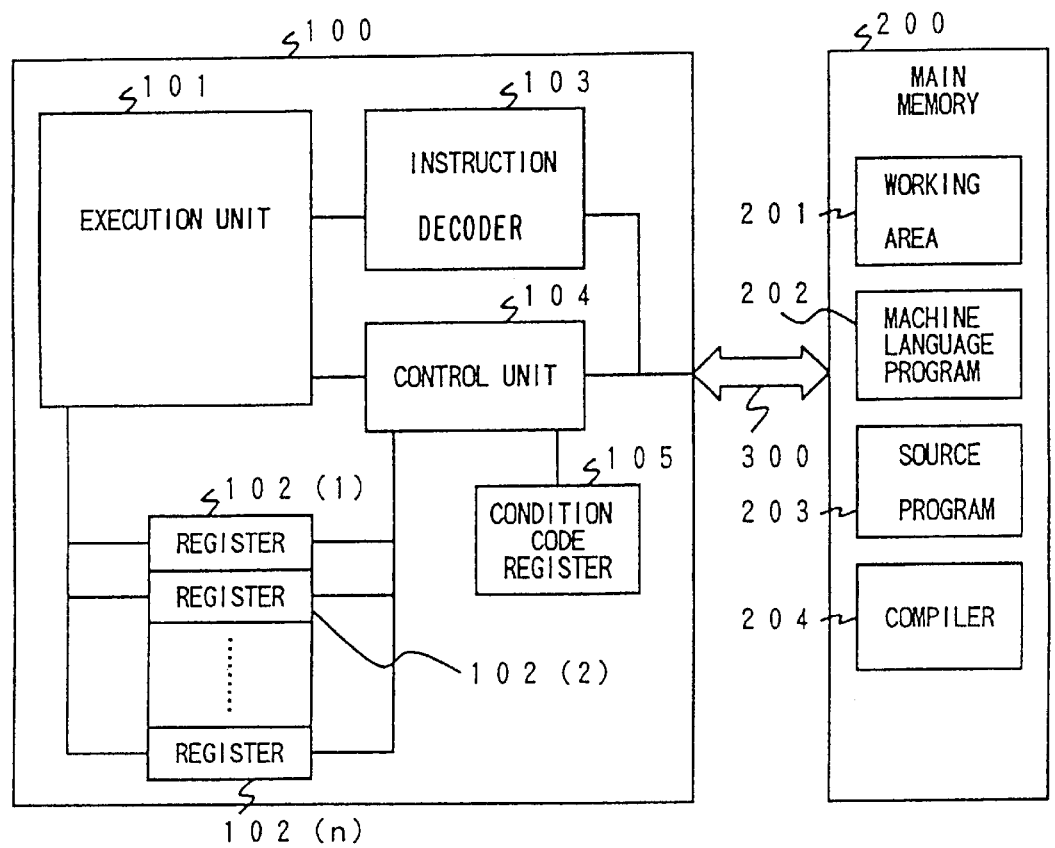
FIG. 2 is a block diagram illustrating a hardware structure of a compiling system according to the present invention.

A description of the principle of a compiling process performed in a compiling system according to the present invention.

The principle of the compiling process is shown in FIG. 1. Referring to FIG. 1, an intermediate text formed of a plurality of intermediate codes is generated from a source program in step S1. Each intermediate code corresponds to an instruction in the source program. An intermediate code 1 has a structure in which a state change of the computer hardware and the linkage protocol, or linkage conventions, can be explicitly indicated as a definition operand. A plurality of values can be maintained in a definition operand portion 1a of the intermediate code 1 using a list, a dynamic array or the like. In step S2, an optimization process is applied to the intermediate text obtained in step S1. The machine language program is generated, in step S3, based on the intermediate text to which the optimization process has been applied.

The intermediate codes generated in step S1 may have the definition operand 1a, a pointer (a state variable) 1b indicating an identifier representing the state change of the computer hardware, and a state attribute portion 1c indicating whether or not the state of the computer hardware is changed by an operation represented by the intermediate code 1. The intermediate code also has a reference operand portion.

In the intermediate code having the above structure, an operand, defined as the main effect of the operation, and a state change of the computer hardware and linkage protocol, defined as a side effect, are explicitly indicated by the definition operand portion 1a.

The state change of the computer hardware and the linkage protocol may be represented by an identifier 2. A plurality of operands defined by the intermediate code 1 may be linked to each other in a list 3 so that a plurality of values are defined by the intermediate code 1. A plurality of operands defined by the intermediate code 1 may be maintained in an array 4 so that a plurality of values are defined by the intermediate code 1. The pointer 1b may double as the state attribute portion 1c.

A description will now be given of embodiments of the present invention.

A compiling system is formed, for example, as shown in FIG. 2. Referring to FIG. 2, a CPU (Central Processing Unit) 100 is coupled to a memory device 200 by a system bus 300. The CPU 100 has a processing portion 101, a plurality of registers 102(1), 102(2), . . . and 102(n), an instruction decoder portion 103, a control unit 104 and a condition code register 105. The memory device 200 has a working area 201 and a compiler 204 is stored therein. A source program 203 to be translated into a machine language program is loaded from an external storage device (not shown) to the memory device 200. Instructions of the compiler 204 are decoded by the instruction decoder portion 103, and the processing portion 101 compiles the source program 204, on the working area 201 of the memory device 200, into a machine language program in accordance with decoded instructions supplied from the instruction decoder portion 103. The control unit 104 controls respective portions of the CPU 100 and data transmission in the CPU 100. The condition code register 105 is provided with condition codes. The machine language program 202 is formed in the memory device 200.

Figure 3:
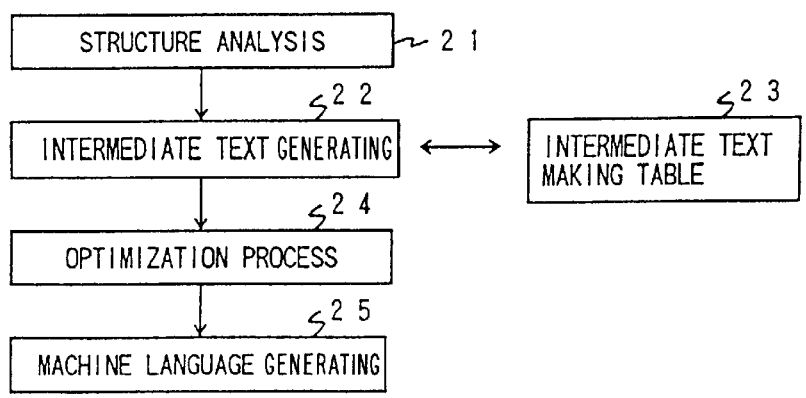
FIG. 3 is a diagram illustrating the principle of the compiling process according to the present invention.

The compiler 204 is formed, for example, as shown in FIG. 3.

Referring to FIG. 3, the compiler has a structure analysis portion 21, an intermediate text generating portion 22, an optimization process portion 24 and a machine language program making portion 25. The structure analysis portion 21 analyzes the structure of the source program 203 stored in the memory device 200. The intermediate text generating portion 22 generates an intermediate text based on results obtained by the structure analysis portion 21 with reference to an intermediate code making table 24. That is, the intermediate text generating portion 22 translates instructions in the source program 203 which instructions are obtained by the structure analysis portion 21 into intermediate codes. The intermediate text generating portion 22 knows the number of variables to be defined and referred to by each intermediate code, a state of the computer hardware to be changed and linkage protocols in processes of instructions, by referring to the intermediate text making table 23. The variables to which each intermediate code refers are assigned to the reference operand and information regarding the variables to be defined, the state to be changed and the linkage protocol are assigned to the definition operand.

The optimization portion 24 checks the intermediate codes generated by the intermediate text generating portion 22, and carries out an optimization process using the check results. Due to the optimization portion 24, the arrangement order of the intermediate codes corresponding to the instructions of the source program is changed so as to be suitable for being processed by the computer, or a plurality of intermediate codes are integrated with each other.

Figure 4:
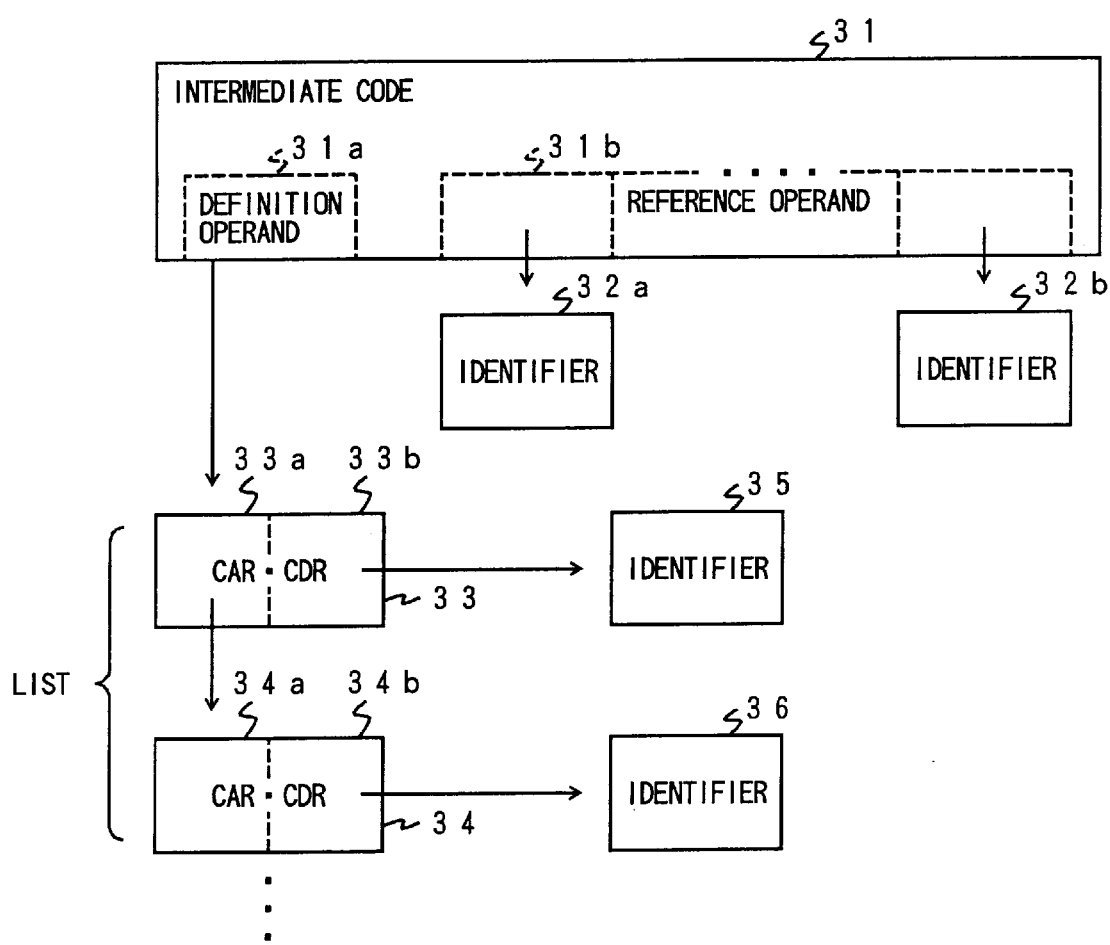
FIG. 4 is a diagram illustrating the structure of an intermediate code according to a first embodiment of the present invention.

In the intermediate text generating portion 22, the state change occurring based on results of an operation is, for example, represented by using an intermediate code, as shown in FIG. 4. In this first embodiment shown in FIG. 4, a plurality of operands are maintained in the intermediate code by linkage of lists.

Referring to FIG. 4, an intermediate code 31 has a definition operand portion 31a and a reference operand portion 31b. Pointers indicating positions at which identifiers 32a and 32b are stored are located in the reference operand portion 31b, and a pointer indicating a position at which a list cell 33 is stored is located in the definition operand portion 31a. Furthermore, a pointer indicating a position at which the next list cell 34 is stored is located in a CAR 33a of the list cell 33, and pointers indicating positions at which identifiers 35 and 36 are stored are respectively set in CDRs 33b and 34b of the list cells 33 and 34. Variables are set by the identifiers 32a and 32b indicated by the reference operand portion 31b, and an operation result associated with the variables and the state change occurring based on the result of the operation are respectively stored in the identifiers 35 and 36 indicated by the definition operand portion 31a. In addition, if list cells are further linked, a large number of definition operands can be set in the intermediate code 31.

According to the first example, a plurality of definition operands are linked by the list cells indicated by the definition operand portion 31a, so that a plurality of information items, such as variables to be defined, the state of the computer hardware to be changed and the linkage protocol, can be set in the definition operand portion 31a.

Figure 5:
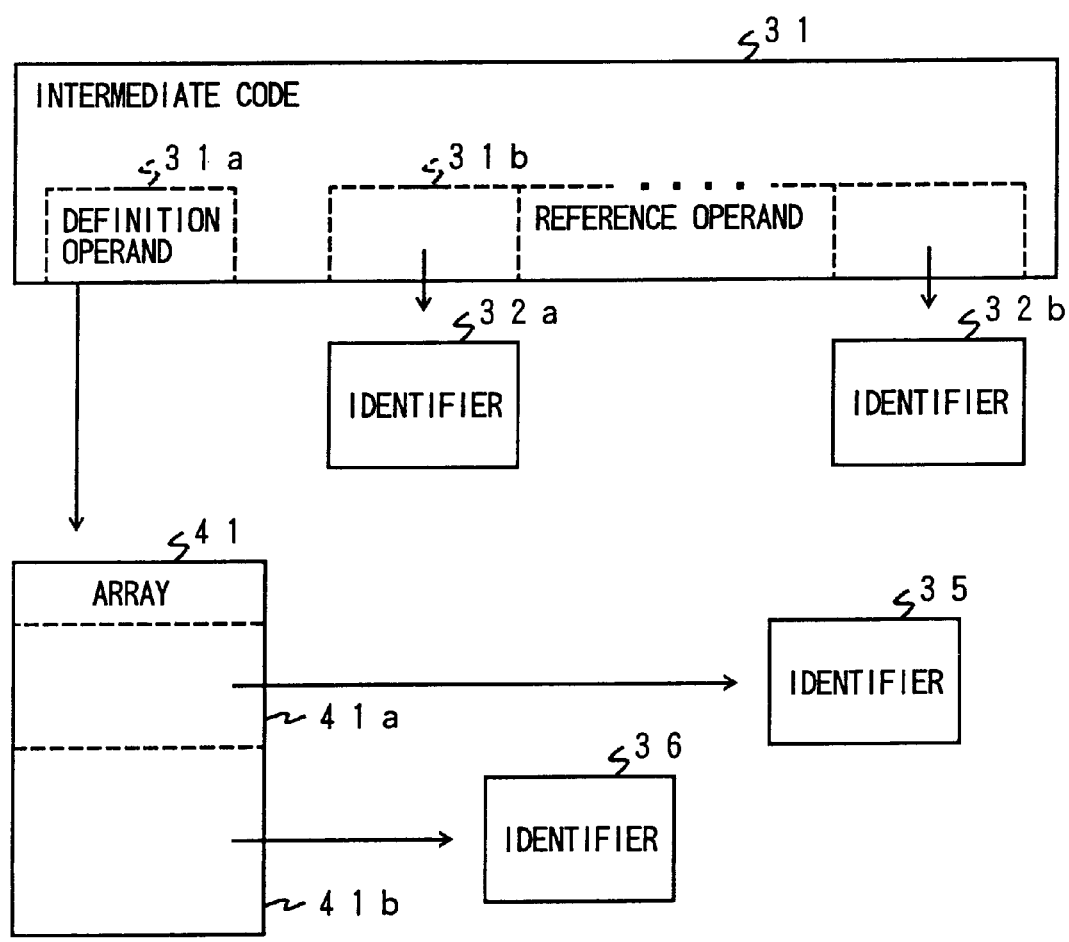
FIG. 5 is a diagram illustrating the structure of an intermediate code according to a second embodiment of the present invention.

FIG. 5 shows a second embodiment of the intermediate code. In this second embodiment, a plurality of definition operands are stored in a dynamic array. The intermediate code 31 has the definition operand portion 31a and the reference operand portion 31b in the same manner as that in the first embodiment. Pointers indicating positions at which identifiers 32a and 32b are stored are located in the reference operand portion 31b, and a pointer indicating a position at which an array 41 is stored is located in the definition operand portion 31a. A pointer indicating a position at which an identifier 35 is stored is located in an element 41a of the array 41, and a pointer indicating a position at which an identifier 36 is stored is located in an element 41b of the array 41. The operation result for the variable indicated by the reference operand portion 31b is stored, for example, in the identifier 35 indicated by the definition operand portion 31a, and the state change occurring based on the operation result is stored in the identifier 36, in the same manner as in the first embodiment. Elements are dynamically allocated in the array 41 in accordance with the number of definition operands in the definition operand portion 31a. That is, when the number of definition operands indicated by the definition operand portion 31a is increased, elements are allocated in the array 41 for the increased number of definition operands.

In the case where a plurality of values are indicated by the definition operand portion 31a, elements are dynamically allocated in the array 41 for the plurality of values of the definition operand portion 31a, and the values of the definition operand portion 31a are stored in the elements of the array 41. As a result, a plurality of information items, such as variables to be defined, the state to be changed, and the linkage protocol, can be maintained in the definition operand portion 31a of each intermediate code, in the same manner as in the first embodiment.

Figure 6:
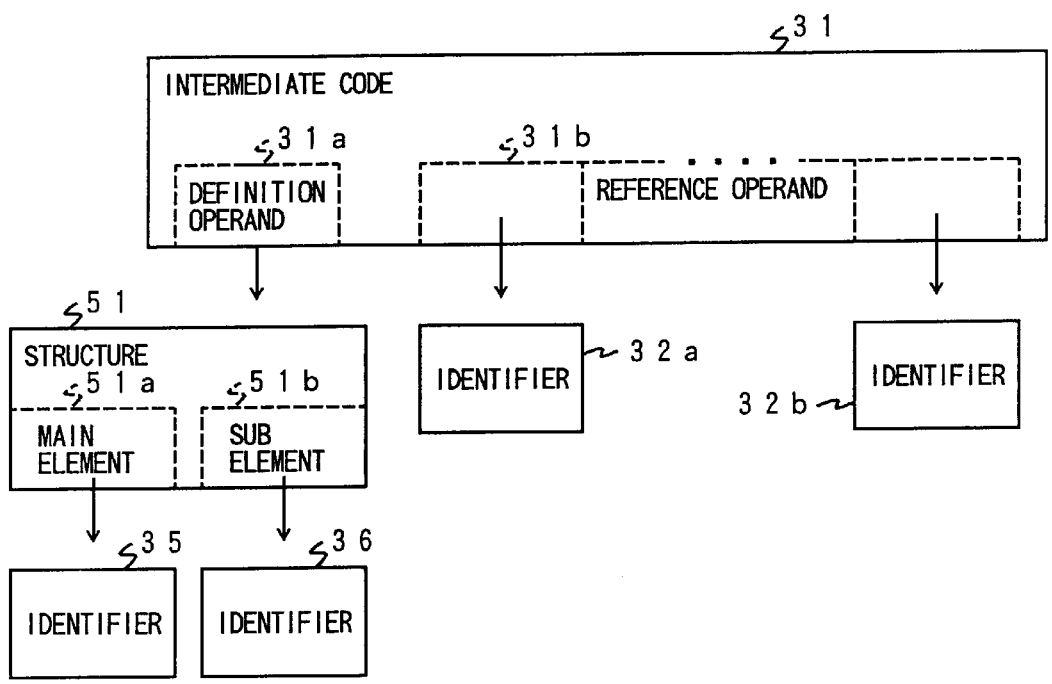
FIG. 6 is a diagram illustrating the structure of an intermediate code according to a third embodiment of the present invention.

FIG. 6 shows a third embodiment of the intermediate code. In the third embodiment, definition operands are indicated by an intermediate code using a structure in which a predetermined number of identifiers can be stored. That is, the structure is prepared, and the pointer of the intermediate code does not point to an identifier but points to the structure, so that a plurality of definition operands are maintained in the intermediate code.

Referring to FIG. 6, the intermediate code 31 has the definition operand portion 31a and the reference operand portion 31b. The reference operand portion 31b is provided with pointers indicating positions at which the identifiers 32a and 32b are stored, and the definition operand portion 31a is provided with a pointer indicating a position at which a structure 51 is stored. In addition, the structure 51 has a main element 51a and a subelement 51b. The main element 51a stores a pointer indicating a position at which the identifier 35 is stored, and the sub element 51b stores a pointer indicating a position at which the identifier 36 is stored. In the identifier 35 pointed to by the definition operand portion 31a, for example, an operation result for a variable indicated by the reference operand portion 31b is stored, and the state change occurring based on results of an operation is stored in the identifier 36, in the same manner as in the first and second embodiments described above.

According to the third embodiment, since the structure 51 in which a plurality of values of the definition operand are stored is used, a plurality of information items, such as variables to be defined, the state of the computer hardware to be changed and the linkage protocol, can be maintained in the definition operand of each intermediate code, in the same manner as in the first and second embodiments.

Figure 7:
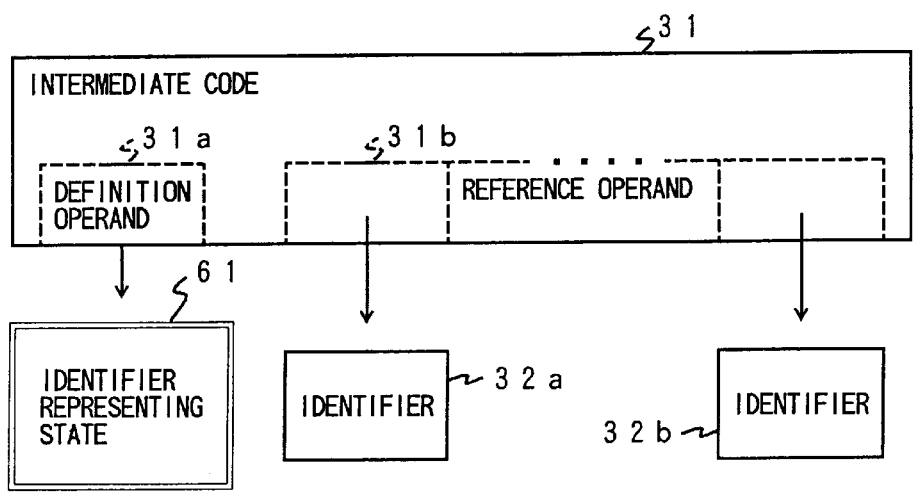
FIG. 7 is a diagram illustrating the structure of an intermediate code according to a fourth embodiment of the present invention.

FIG. 7 shows a fourth embodiment of the intermediate code. In the fourth embodiment, the state change is recorded in the definition operand portion of each intermediate code.

Referring to FIG. 7, the intermediate code 31 has the definition operand portion 31a and the reference operand portion 31b, the reference operand portion 31b being provided with pointers indicating positions at which the identifiers 32a and 32b are stored, the definition operand portion 31a being provided with a pointer indicating a position at which an identifier 61 is stored. The identifier 61 indicates a state. An "attribute value indicating a state of the computer" is added to a set of attribute values, each of the attribute values indicating a data type of the identifier 61. That is, the state of the computer hardware is added, as a type to be indicated by the identifier 61, to variables, constants, addresses and the like, so that the state of the computer, such as a condition code described above, can be represented by the identifier 61.

In the fourth embodiment, since a type indicating the state of the computer hardware is added to the types to be represented by the identifier 61, the state change of the computer can be represented by the identifier 61. According to this, hardware having an architecture in which a variable having an "attribute indicating the state of the computer" can not be assigned to a normal register can be used in the same manner as that having no such limitation.

Figure 8:
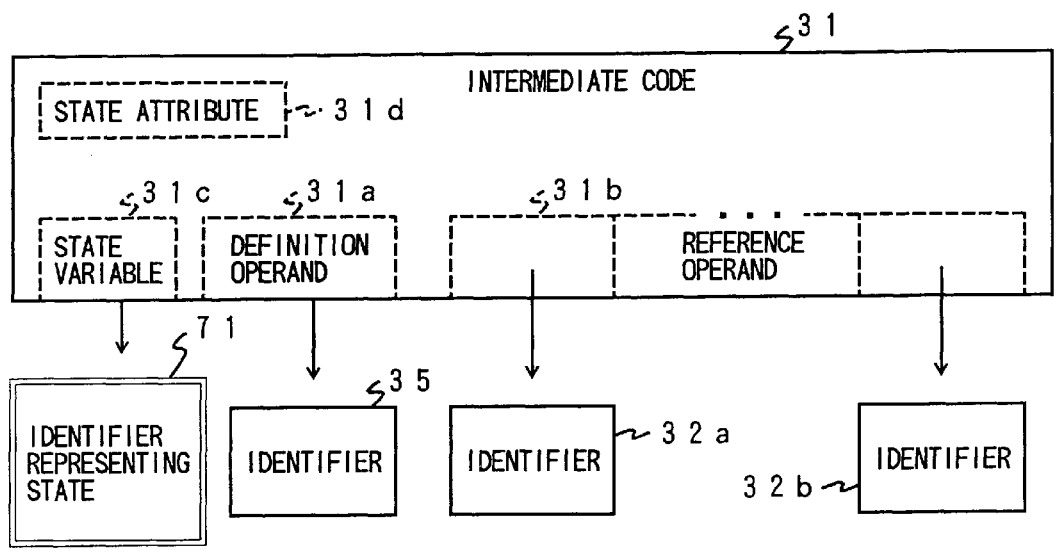
FIG. 8 is a diagram illustrating the structure of an intermediate code according to a fifth embodiment of the present invention.

FIG. 8 shows a fifth embodiment of the intermediate code. In the fifth embodiment, the intermediate code has a state attribute portion and a state variable portion.

Referring to FIG. 8, the intermediate code 31 has the definition operand portion 31a and the reference operand portion 31b, the reference operand portion 31b being provided with pointers indicating positions at which the identifiers 32a and 32b are stored, the definition operand portion 31a being provided with a pointer indicating a position at which the identifier 35 is stored. The intermediate code 31 also has a state variable portion 31c and a state attribute portion 31d. The state variable portion 31c is provided with a pointer indicating a position at which an identifier 71 representing a state is stored. The state of the computer hardware, such as a condition code, may be recorded in the identifier 71. The state attribute portion 31d has information indicating whether or not the intermediate code causes the state of the computer to change. It can be determined, with reference to the state attribute portion 31d, whether or not the state of the computer is recorded in the identifier 71.

According to the fifth embodiment, the intermediate code has the state attribute portion indicating whether or not the intermediate code makes the state of the computer change, and a type indicating the state of the computer is added to the types to be represented by the identifier. Thus, the state change of the computer can be recorded in the intermediate code 31.

Figure 9:
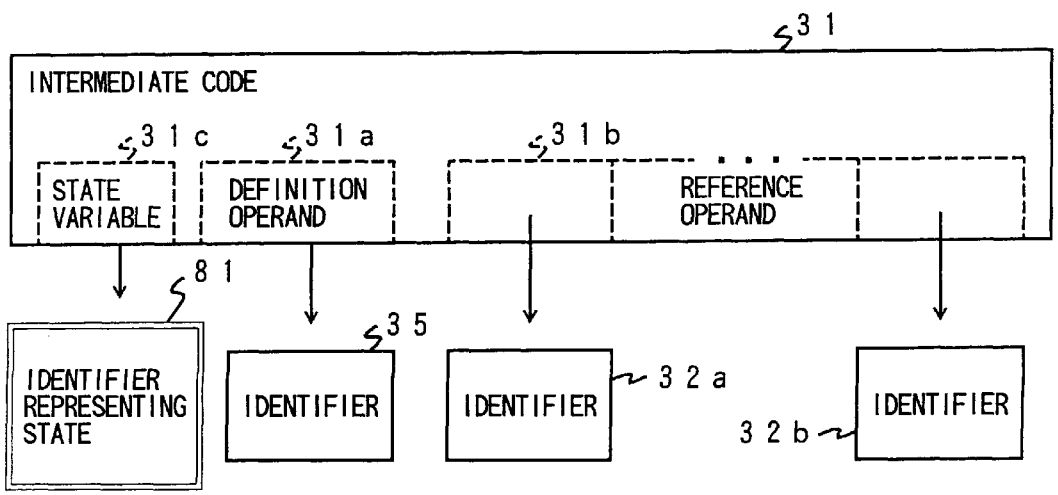
FIG. 9 is a diagram illustrating the structure of an intermediate code according to a sixth embodiment of the present invention.

FIG. 9 shows a sixth embodiment of the intermediate code. In this sixth embodiment, the intermediate code has a state variable portion which doubles as a state attribute portion.

Referring to FIG. 9, the intermediate code 31 has the definition operand portion 31a and the reference operand portion 31b, the reference operand portion 31b being provided with pointers indicating positions at which the identifiers 32a and 32b are stored, the definition operand portion 31a being provided with a pointer indicating a position at which the identifier 35 is stored. The intermediate code 31 has also a state variable portion 31c which is also used to indicate a state attribute. When there is no state change of the computer, a value, such as "0", which is not used as a pointer value is set in the state variable portion 31c. When there is state change of the computer, the state variable portion 31c is provided with a pointer indicating a position at which an identifier 81 indicating the state of the computer is stored.

In the sixth embodiment, the intermediate code 31 has the pointer pointing to the identifier 81 indicating the state of the computer, which pointer is separated from the definition operand portion 31a and doubles as the attribute indicating whether or not the intermediate code 31 causes the state of the computer to change. Thus, the state change of the computer can be recorded in the intermediate code, in the same manner as in the fifth embodiment.

Figure 10:
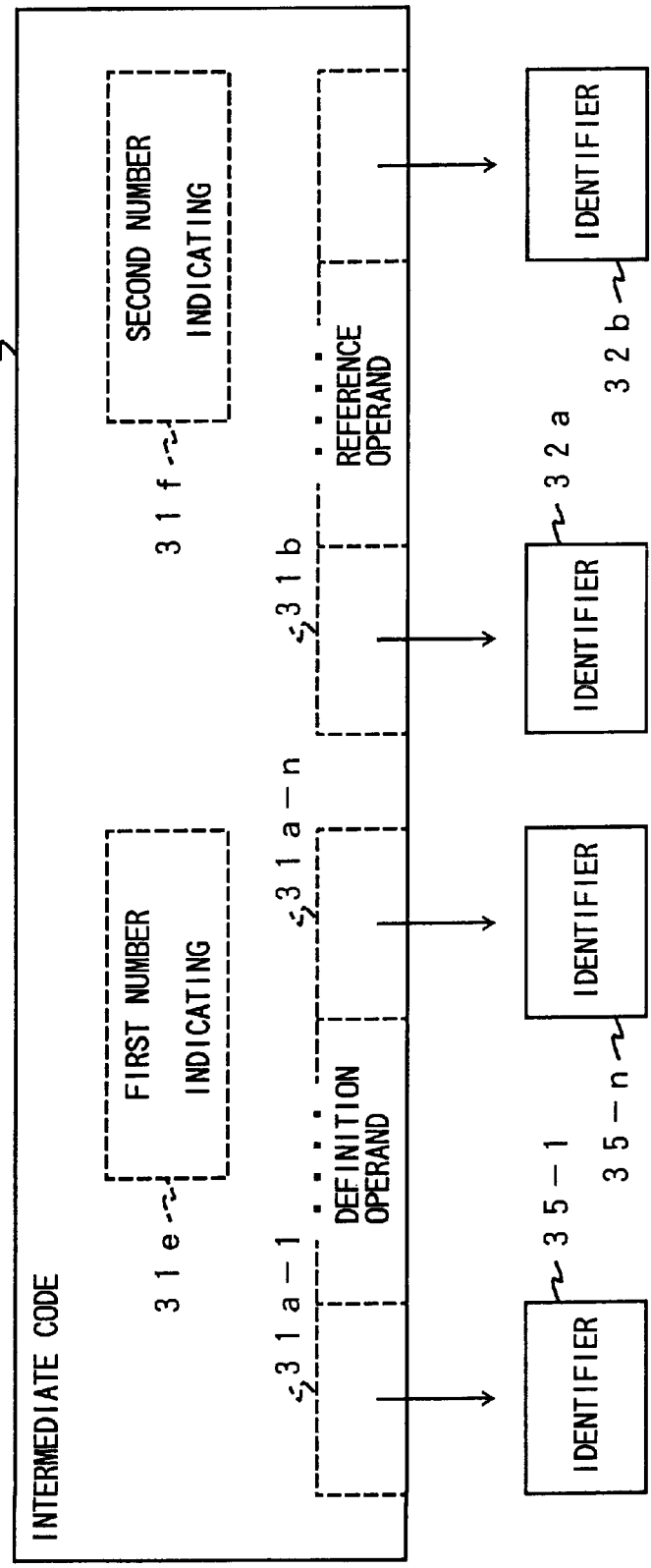
FIG. 10 is a diagram illustrating the structure of an intermediate code according to a seventh embodiment of the present invention.

FIG. 10 shows a seventh embodiment of the intermediate code. In this seventh embodiment, the intermediate code has a plurality of definition operands.

Referring to FIG. 10, the intermediate code 31 has a plurality of definition operand portions 31a-1, . . . , and 31a-n and the reference operand portion 31b. The reference operand portion 31b is provided with the pointers indicating the positions at which the identifiers 32a and 32b are stored, and the definition operand portions 31a-1, . . . , and 31a-n are provided with pointers indicating positions at which identifiers 35-1, . . . , and 35-n are stored, each of which identifiers represents a state of the computer. The intermediate code 31 has also a first number indicating portion 31e and a second number indicating portion 31f. The first number indicating portion 31e indicates the number of definition operands, and the second number indicating portion 31f indicates the number of reference operands.

In the seventh embodiment, the limitation regarding the number of definition operands provided in the intermediate code is eliminated, and the number of definition operands and the number of reference operands are indicated in one intermediate code. Thus, a plurality of information items, such as variables to be defined, states to be changed and the linkage protocol, can be maintained as the definition operands.

Figure 11:
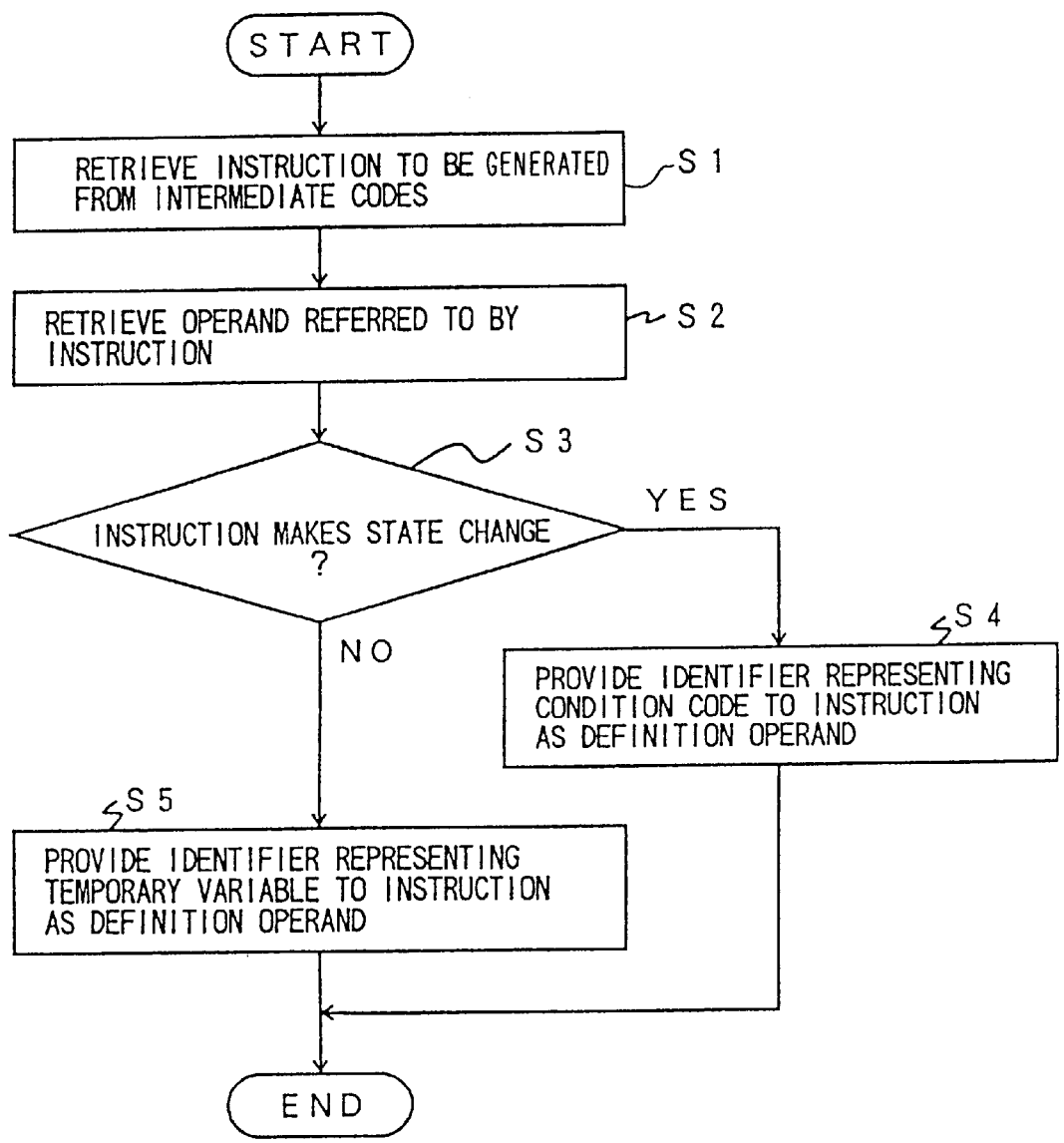
FIG. 11 is a flow chart illustrating an example of a process for generating an intermediate text.

FIG. 11 shows a process performed by the intermediate text generating portion 22. In the process shown in FIG. 11, an identifier indicating a condition code is generated, and the identifier is provided, as a definition operand, to the intermediate code. Referring to FIG. 11, in step S1, an intermediate code to be generated is retrieved from the intermediate text generating table 23 based on an instruction in the source program to which the structure analysis is applied by the structure analysis portion 21. In step S2, operands to which the intermediate code obtained in step S1 refers are retrieved. It is then determined, in step S3, whether or not the intermediate code causes a condition code to change. If the intermediate code causes the condition code to change, the process proceeds from step S3 to step S4. In step S4, an identifier representing the condition code is generated and the identifier is provided as the definition operand to the intermediate code. That is, the identifier representing the condition code is generated as the definition operand of the intermediate code as described in each of the first to seventh embodiments described above. On the other hand, if the intermediate code does not cause the condition code to change, the process proceeds from step S3 to step S5. In step S5, an identifier representing a temporary variable is made, and the identifier is provided as the definition operand to the intermediate code.

Figure 12:
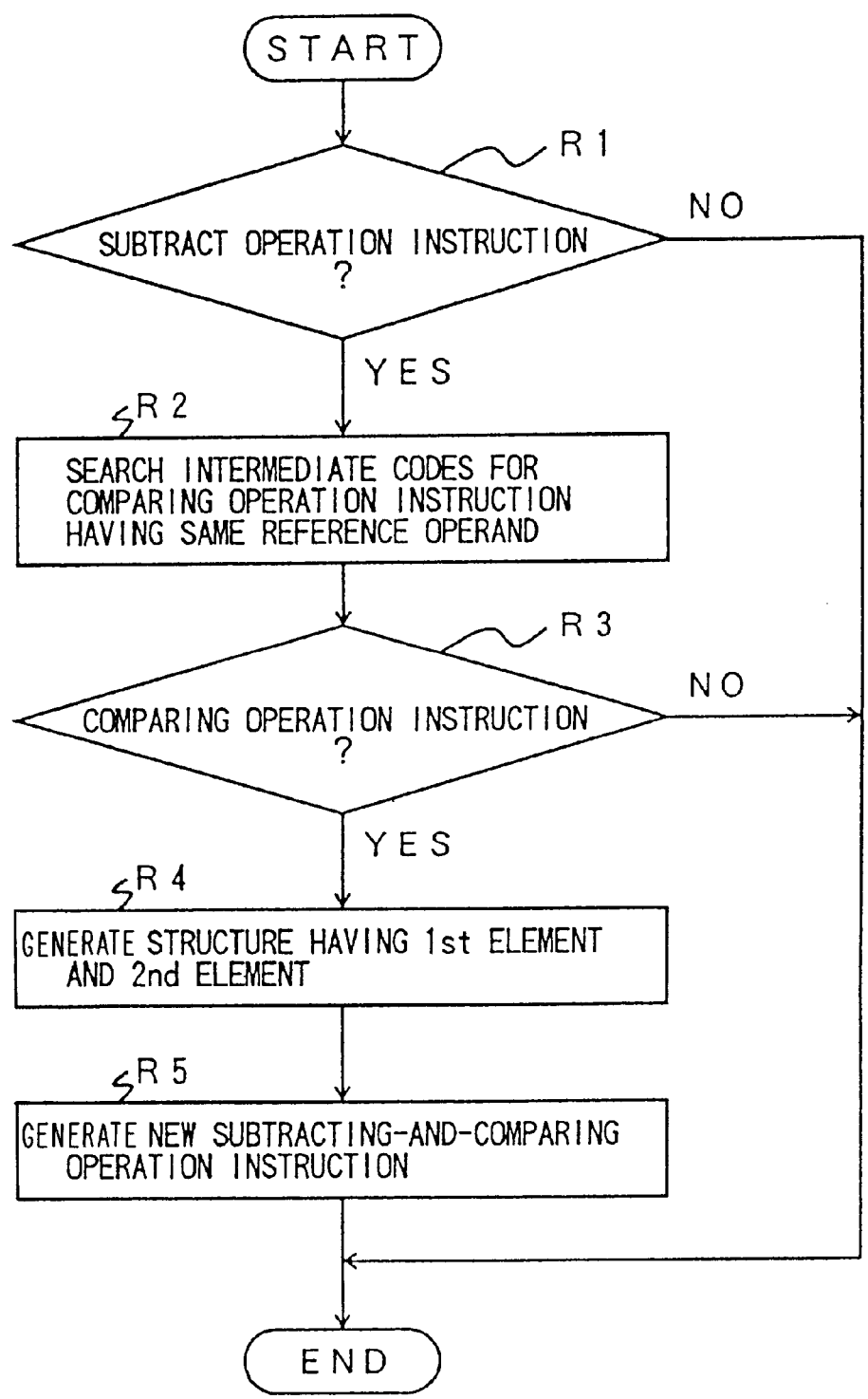
FIG. 12 is a flow chart illustrating an example of an optimization process for integrating a subtracting operation instruction and a comparing operation instruction with each other.

FIG. 12 shows an example of the optimization process applied to intermediate codes generated by the intermediate text generating portion 22. In the optimization process shown in FIG. 12, a subtraction operation instruction and a comparison operation instruction are integrated with each other. Referring to FIG. 12, it is determined, in step R1, whether or not an intermediate code is a subtraction operation instruction. If the intermediate code is not the subtraction operation instruction, the process is terminated. If it is determined, in step R1, that the intermediate code is the subtraction operation instruction, a comparison operation instruction having the same reference operands as the subtraction operation instruction is retrieved from intermediate codes generated by the intermediate text generating portion 22 in step R2. It is then determined in step R3 whether or not the comparison operation instruction has been retrieved in step R2. If there is no comparison operation instruction, the process is terminated. On the other hand, if it is determined that the comparison operation instruction has been retrieved from the intermediate codes, a structure in which a predetermined number of identifiers can be maintained is created in step R4. The structure has, as a first element, the definition operand, the subtraction operation instruction, and, as a second element, the definition operand of the comparison operation instruction. In step S5, a new subtraction-and-comparison operation instruction is generated. The new subtraction-and-comparison operation instruction has the same reference operands as the original subtraction operation instruction and the original comparison operation instruction. The definition operand of the new subtraction-andcomparison operation instruction is the structure in which the predetermined number of identifiers can be maintained. Results based on both the subtraction operation instruction and the comparison operation instruction are recorded in the definition operand of the new subtraction-and-comparison operation instruction.

Figure 13:
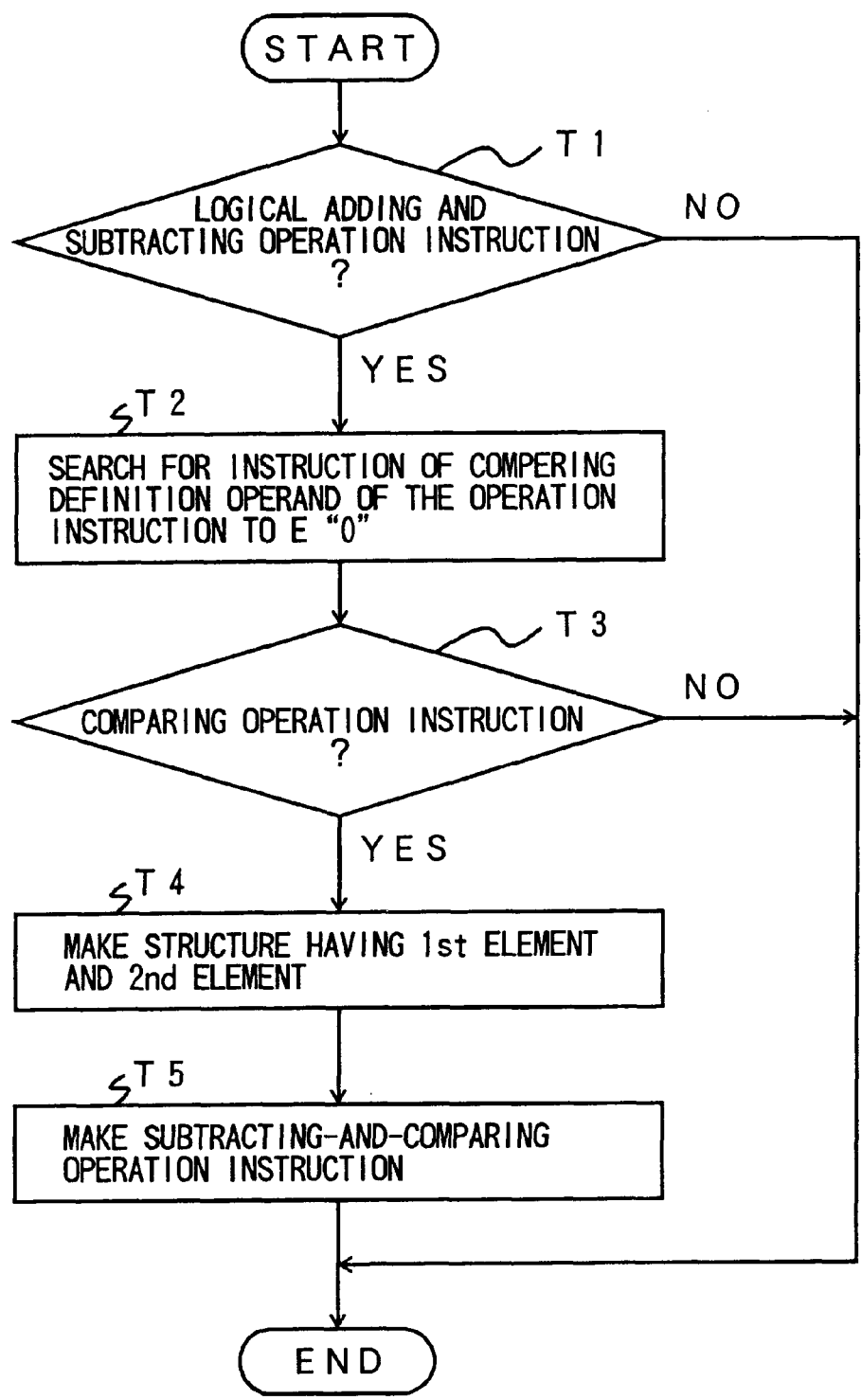
FIG. 13 is a flow chart illustrating an example of an optimization process for integrating a logical adding and subtracting operation instruction and a comparing operation instruction with each other.

FIG. 13 shows another example of the optimization process applied to the intermediate codes generated by the intermediate text generating portion 22. In the optimization process shown in FIG. 13, a logical addition and subtraction operation instruction and a comparison operation instruction are integrated with each other.

Referring to FIG. 13, it is determined in step T1 whether or not an intermediate code is a logical addition and subtraction operation instruction. If the intermediate code is not the logical addition and subtraction operation instruction, the process is terminated. On the other hand, if it is determined in step T1 that the intermediate code is the logical addition and subtraction operation instruction, an instruction in which the definition operand of the logical addition and subtraction operation instruction is compared with "0" is retrieved from the intermediate codes generated by the intermediate text generating portion 22 in step T2. It is then determined in step T3 whether or not a comparison operation instruction exists. If there is no comparison operation instruction, the process is terminated. On the other hand, if the comparison operation instruction exists, a structure in which a predetermined number of identifiers can be maintained is created in step T4. The structure has a first element which is the definition operand of the logical addition and subtraction operation instruction and a second element which is the definition operand of the above comparison operation instruction. In step T5, a new subtraction-and-comparison operation instruction is generated. The new subtraction-and-comparison operation instruction has the same reference operands as the original operation instruction, and the definition operand is represented by the structure in which the predetermined number of identifiers can be maintained.

According to the above embodiments, since a plurality of values can be defined as the definition operand in each intermediate code, the optimization process in which the subtraction operation instruction or the logical addition and subtraction operation instruction can be integrated with the comparison operation instruction, as shown in FIGS.12 and 13 is possible. As a result, the optimization effect can be improved.

In the above optimization processes, the structure in which a predetermined number of identifiers can be maintained is used. However, the present invention is not limited to this, but a plurality of values can be defined in the intermediate code described in each of the first to seventh embodiments.

Figure 14A:
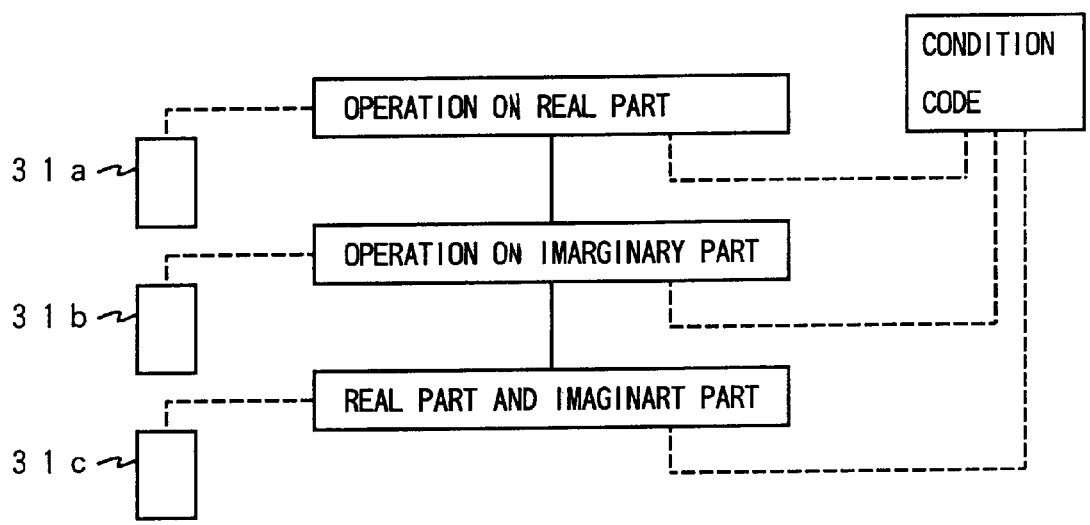
FIG. 14A is a diagram illustrating conventional intermediate codes used for calculation of complex numbers.

FIG. 14A shows conventional intermediate codes for operating on a complex number. In each of the conventional intermediate codes shown in FIG. 14A, a plurality of values can not defined therein, so that the operation on a complex number must be separated into an operation on a real part and an operation on an imaginary part. The intermediate codes are respectively coupled to identifiers 31a, 31b and 31c. In addition, since a condition code can not be assigned to each intermediate code, it can not be determined by checking one intermediate code whether or not the intermediate code may be either moved, copied or deleted. Furthermore, to determine whether or not a variable should be alive, it is necessary to consider not only one intermediate code but also other text instructions having the same definition point.

Figure 14B:
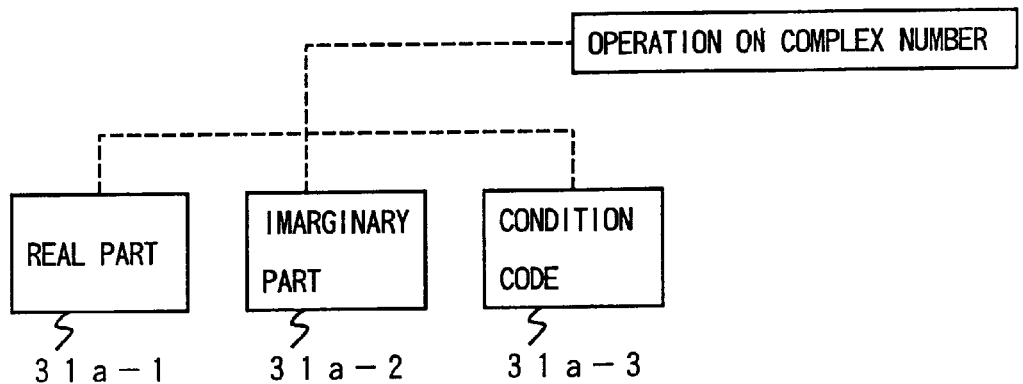
FIG. 14B is a diagram illustrating an intermediate code, according to the present invention, used for the calculation of complex numbers.

FIG. 14B shows an intermediate text according to the present invention. In the intermediate code according to the present invention, a plurality of values can be defined. Thus, as shown in FIG. 14B, a real part, an imaginary part and a condition code can be respectively assigned to definition operands 31a-1, 31a-2 and 31a-3. As a result, the operation of the complex number can be represented by a single intermediate code.

The present invention is not limited to the aforementioned embodiments, and variations and modifications may be made without departing from the scope of the claimed invention.

What is claimed is:

1. A compiling system, comprising:

first means for converting a source program into an intermediate text formed of a plurality of intermediate codes, each intermediate code having a data structure for storing a plurality of operands which include at least one of an operand containing a result value and an operand containing information on a state of computer hardware; and second means for generating a machine language program from the intermediate codes of the intermediate text.

2. The compiling system as claimed in claim 1, wherein the information regarding the state of the computer hardware includes information regarding a change in the state of the computer hardware.

3. The compiling system as claimed in claim 1, wherein the information regarding the state of the computer hardware includes information regarding a state of hardware provided in a linkage convention, the linkage convention being a rule defining how a subroutine call is performed.

4. The compiling system as claimed in claim 1, wherein the information regarding the state of the computer hardware is represented as an identifier in a manner similar to other operands.

5. The compiling system as claimed in claim 1, wherein the information regarding the state of the computer hardware has a first portion containing information on whether an operation represented by an intermediate code causes the state of the computer hardware to change and a second portion containing an identifier representing a changed state of the computer hardware.

6. The compiling system as claimed in claim 5, wherein said second portion also serves as said first portion to indicate whether an operation represented by the intermediate code causes the state of the computer hardware to change, said second portion containing the identifier.

7. A compiling system, comprising:

a text converter to convert a source program into an intermediate text formed of intermediate codes, each intermediate code having a portion used to define a plurality of values, including at least one of a result value and a value representing a state of computer hardware; and a program generator, coupled to said text converter, to generate a machine language program from the intermediate codes of the intermediate text.

8. The compiling system as claimed in claim 7, wherein said portion used to define said plurality of values is a definition operand portion of each of the intermediate codes.

9. The compiling system as claimed in claim 7, wherein said portion used to define said plurality of values is provided with information indicating a plurality of definition operands so that said plurality of values are defined.

10. The compiling system as claimed in claim 9, wherein said plurality of definition operands are linked in a list.

11. The compiling system as claimed in claim 9, wherein said plurality of definition operands are maintained in an array.

12. The compiling system as claimed in claim 7, wherein said plurality of values include information regarding the state of the computer hardware, the computer hardware being operated in accordance with the machine language program.

13. A compiling system for a computer comprising:

first means for converting each instruction in a source program into an intermediate code, each intermediate code having:

a state attribute representing whether the state of the computer is changed by an operation represented by the intermediate code; and a definition operand indicating a plurality of operands corresponding to at least one of a result value and an effect of the instruction, including a state variable representing a state change of the computer; and second means for generating a machine language program from the intermediate codes.

14. A compiling system as set forth in claim 13, wherein the plurality of operands are maintained in an array.

15. A compiling system, as set forth in claim 13, wherein the plurality of operands are maintained in a linked list.

16. A computer readable medium encoded with a program to compile source code in an efficient and optimized manner by controlling a computer to perform a method comprising:

converting instructions in the source code into a plurality of intermediate codes, each intermediate code having:

a state attribute representing whether the state of the computer is changed by an operation represented by the intermediate code; and a definition operand indicating a plurality of operands corresponding to at least one of a plurality of values and an effect of the instructions, including a state variable representing a state change of the computer; and generating from the intermediate codes a machine language program to operate the computer.

17. A computer readable medium, as set forth in claim 7, further comprising optimizing the plurality of intermediate codes based on the plurality of operands indicated by the definition operand by integrating subtraction operation instructions with comparison operation instructions and integrating logical addition and subtraction operation instructions with comparison operation instructions.

* * * * *